July 24, 1928. 1,678,123
J. A. PATCH
APPARATUS FOR REMOVING OIL FROM COD LIVERS
Filed Nov. 27, 1925
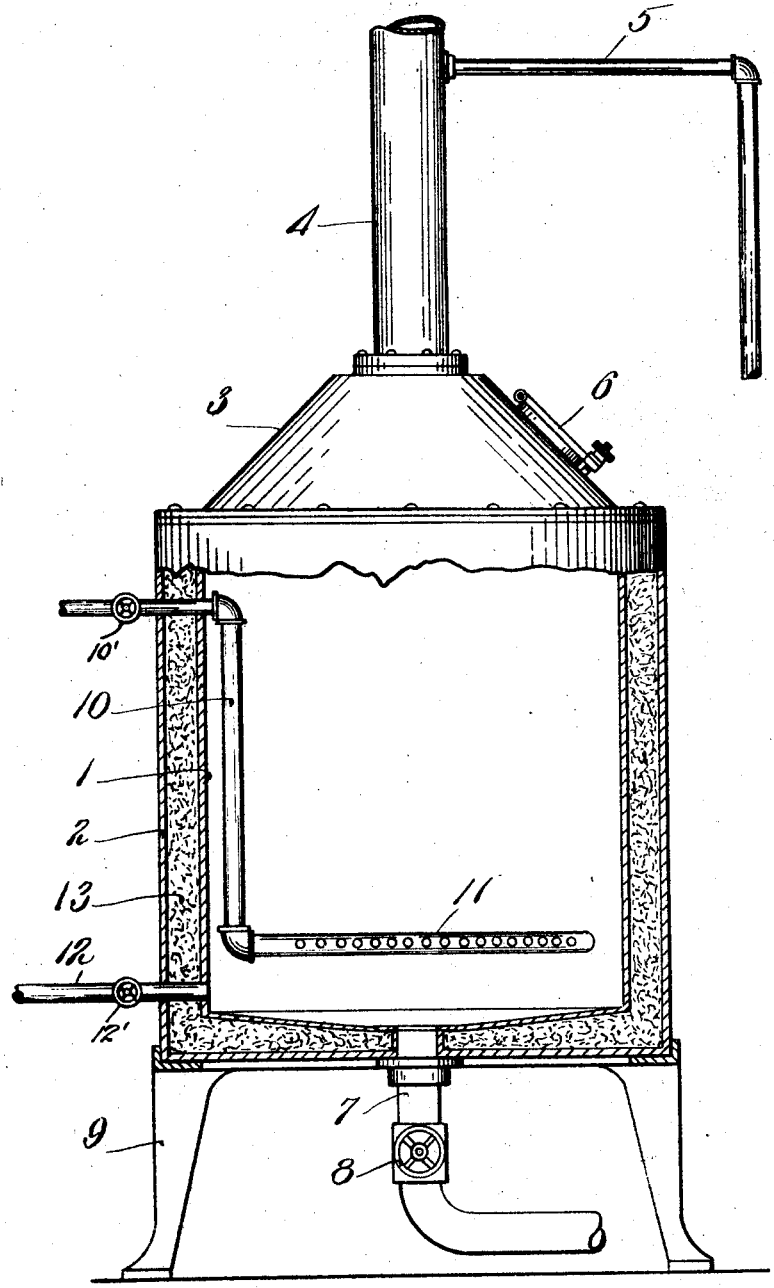
Inventor
James A. Patch
By Henry C. Thomson
Attorney.

Patented July 24, 1928.

1,678,123

UNITED STATES PATENT OFFICE.

JAMES A. PATCH, OF STONEHAM, MASSACHUSETTS.

APPARATUS FOR REMOVING OIL FROM COD LIVERS.

Application filed November 27, 1925. Serial No. 71,731.

This invention relates to apparatus for extracting oil from oleaginous material by the introduction of live steam into the material, and particularly to apparatus of this kind adapted for rendering fish livers. Objects of the invention reside in the novel and simplified construction of my apparatus and include the provision of means whereby the extracted oil is raised into a restricted portion of the apparatus and is thus so accumulated that the quality of the oil removed from the restricted portion will be improved.

The utility of my invention is particularly desirable when this apparatus is installed on shipboard, since one purpose of my improved device is to reduce possible agitation of the oil consequent to the motion of the ship.

Apparatus embodying my invention consists in general of a digester for rendering the oleaginous material, a vertical restricted stand-pipe connected above the digester, means for introducing steam into the digester to extract oil from the material, means for raising the extracted oil into the stand-pipe, and an outlet in the stand-pipe permitting the oil to be drawn off.

One embodiment of the invention is shown for purposes of illustration in the accompanying drawing which shows an improved digester in elevation, with portions thereof in transverse section.

The apparatus comprises a metal kettle, or digester, 1, open at the top and having enveloping jacket 2, with suitable insulating material 13, inserted therebetween to retain heat within the kettle. Bolted to the top of the kettle is a metal hood 3, in shape defining a truncated cone, and appropriately fastened to the restricted top of the hood is an elongated stand-pipe, 4, having a diameter substantially less than the diameter of the kettle 1 and being open at the top.

An outlet or delivery pipe 5 is attached to the stand-pipe at a point therein substantially above the top of the hood 3, and may lead in any desired direction from the stand-pipe to a suitable oil receptacle. The hood 3 is provided with a suitable trap-door 6 to permit material, such as fish livers, to be inserted into the kettle 1; and the kettle has an outlet pipe 7, for the removal of used material. The pipe 7 is preferably centrally located in the bottom wall of the kettle, and has a hand-operated quick acting discharge valve located adjacent the kettle. Legs 9 are provided for the kettle to permit ready access to the valve 8, or to provide space for the insertion of a receptacle beneath the outlet pipe 7.

Since the rendering of fish livers is best achieved by the introduction of live steam into the mass of livers, the kettle is provided with a steam inlet pipe 10 and has a valve 10' located adjacent to the kettle and perforated steam coil 11 suspended within the kettle by the pipe 10 a short distance above the bottom wall of the kettle. A water inlet pipe 12 provided with a valve 12' adjacent to the kettle leads into the kettle adjacent its bottom wall which preferably slopes downwardly toward the central outlet pipe 7.

In operation, the fish livers, or other oleaginous material to be rendered, is dumped into the kettle 1 through the trap-door 6, until the kettle is substantially full. The trap-door is closed and steam is then admitted to the kettle through the pipes 10 and 11, and the livers are cooked a sufficient period of time to release the oil therefrom. When sufficient oil has accumulated on the surface of the mass, the steam is shut off, and cold water is introduced to the kettle through the inlet pipe 12, in order to raise the oil-containing surface of the contents into the restricted stand-pipe 4. This operation is continued until substantially all the extracted oil has been raised to, and drawn off by the outlet pipe 5.

It is then preferred to draw off a portion of the water through the discharge pipe 7, and again cook the mass by introducing steam until the mass boils. The steam is then shut off and the contents of the kettle are permitted to stand a longer time than in the first instance until a second layer of oil separates and rises to the surface, the insulating jacket making it possible to maintain a temperature of approximately, but below, 212° Fahrenheit to prevent fermentation of contents. Raising the mass in the manner aforesaid permits this oil to flow off through the outlet pipe 5, after which the cooked liver and residue in the kettle are drawn off through the discharge pipe 7.

It is evident from the foregoing description that my improved rendering apparatus is very simple and economical both of construction and operation, and that, owing to the substantial length of the stand-pipe above the hood, a large quantity of concentrated oil which is floating above the digested residue is obtained in the stand-pipe, permitting the drainage of oil through the outlet 5 without the provision of a complicated system of drain pipes at various levels of the elevated liquid in the kettle. The digester is particularly adapted to be installed on shipboard so that fish livers may be digested while in fresh condition. The relatively small diameter of the stand-pipe precludes any agitation of the oil which ordinarily results from the motion of the ship, and since the contents of the kettle are completely enclosed, the danger that operators will be burned by slopping over of the contents is eliminated.

While the foregoing description illustrates one operable embodiment of my invention, it is obvious that details of construction may be varied to suit particular requirements, and that my invention is not to be limited except as it is described in the following claims.

I claim:

1. Apparatus for extracting oil from oleaginous material comprising a closed vertical digester for the material, an upstanding open ended stand-pipe connected with the digester, and of such small diameter as to preclude agitation of oil therein due to movement of the digester and pipe, means for introducing steam into the digester to disintegrate the material and extract the oil therefrom, means for introducing water into the digester near the bottom thereof to raise the oil extracted from the material into said stand-pipe, and a second pipe leading from said stand-pipe at a point substantially above the top of the digester, adapted to decant from said stand-pipe the oil upraised therein.

2. In combination with a vertical digester for extracting oil from oleaginous material, a stand-pipe connected with the top of the digester, means for introducing steam into the digester to digest the material, and means for introducing water into the digester near the bottom thereof to raise the oil liberated therefrom into the stand-pipe and an outlet in said stand-pipe substantially above the top of the digester for drawing off oil from the stand-pipe, said stand-pipe of such small diameter as to preclude agitation of oil therein due to the movement of digester and pipe.

3. Apparatus for extracting oil from oleaginous material comprising an insulated kettle adapted to receive said material, a conical metal hood secured to the top of the kettle, and a stand-pipe attached to said hood, the stand-pipe being open at the top and having a diameter of such small diameter as to preclude agitation of oil therein due to movement of digester and pipe, means for introducing steam into the kettle to disintegrate said material and extract oil therefrom, means for introducing water into the kettle near the bottom thereof to raise the oil into the standpipe, and an outlet in said stand-pipe substantially above the top of said hood, adapted to decant from said stand-pipe the oil upraised therein.

In testimony whereof I affix my signature.

JAMES A. PATCH.